J. P. BROWNLEE.
RUNNING GEAR FOR BUGGIES.
APPLICATION FILED NOV. 29, 1911.
1,121,972.
Patented Dec. 22, 1914.
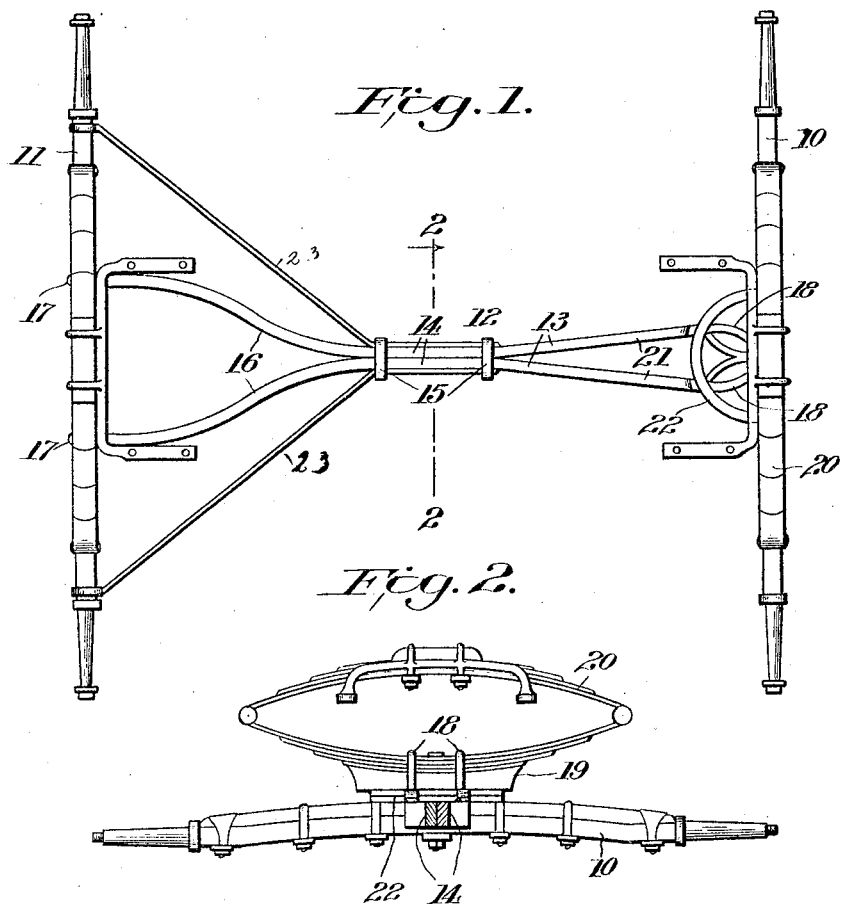
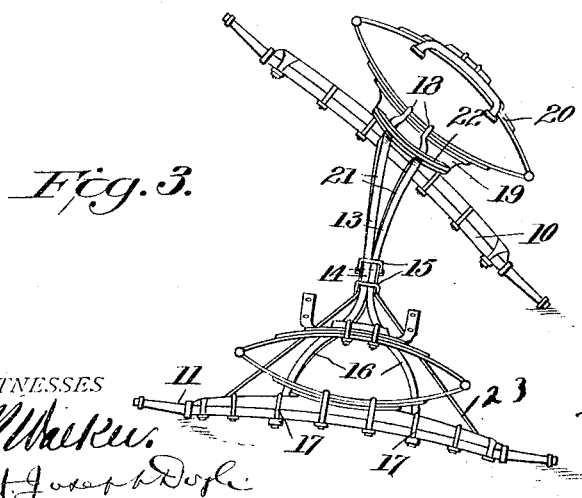
WITNESSES
INVENTOR
Joseph P. Brownlee
By James DuShane
Attorney

UNITED STATES PATENT OFFICE.

JOSEPH P. BROWNLEE, OF SOUTH BEND, INDIANA, ASSIGNOR TO THE STUDEBAKER CORPORATION, OF SOUTH BEND, INDIANA, A CORPORATION OF NEW JERSEY.

RUNNING-GEAR FOR BUGGIES.

1,121,972. Specification of Letters Patent. Patented Dec. 22, 1914.

Application filed November 29, 1911. Serial No. 663,059.

*To all whom it may concern:*

Be it known that I, JOSEPH P. BROWNLEE, a citizen of the United States, residing at South Bend, in the county of St. Joseph and State of Indiana, have invented certain new and useful Improvements in Running-Gear for Buggies, of which the following is a specification.

This invention relates to certain new and useful improvements in running gear for buggies, and the like.

The invention has for its object to produce a running gear that will be simple in construction, and yet light in weight, and which will possess maximum strength.

A further object is to provide a running gear or reach capable of resisting lateral stress, but which at the same time possess great torsional flexibility.

The invention will be hereinafter fully set forth and particularly pointed out in the claim.

In the accompanying drawing: Figure 1 is a plan view illustrating my improved running gear. Fig. 2 is a transverse sectional view on the line 2—2, Fig. 1. Fig. 3 is a perspective view illustrating the torsional flexibility.

Referring to the drawing 10 designates the front axle and 11, the rear axle of a vehicle, connected by the reach designated as a whole by the numeral 12. Said reach comprises two members 13, 13, having abutting middle portions 14 extending longitudinally of the vehicle and united by bolts or clips 15. The rear ends of said members 13 diverge into approximate Y-shape as indicated at 16, and are secured to the rear axle 11 in any suitable manner, as for instance by the clips 17, thus forming a brace. The forward ends of the bars or members 13 are secured by means of clips 18 to the front bolster 19, which also carries the front spring 20. The portions of members 13 forward of the abutting portions are straight and diverge, as indicated at 21, but to a much less degree than the portions 16 and upon this divided part rides the fifth wheel 22 which is secured to the front axle 10 in the usual manner. The rear-axle is braced by rods 23 extending from points near the ends of the axle to the middle portion of the reach, the forward ends of said rods being clamped against the reach by the clips 15.

From the foregoing it will be observed that I have produced a running gear that is exceedingly simple in construction, light in weight, and yet very strong. By constructing the reach in the manner described the same possesses sufficient rigidity to resist lateral stress, and yet by providing the straight, slightly diverging portions 21 a maximum torsional flexibility is provided for, thus allowing the front and rear wheels to readily adjust themselves to inequalities of a road, as will be more readily understood from Fig. 3 of the drawing which illustrates the front axle elevated high above the plane of the rear axle.

Having thus explained the nature of my said invention, and described an operative manner of constructing and using the same, although without attempting to set forth all of the forms in which it may be made, or all of the forms of its use, what I claim is:—

An improved running gear for buggies and the like comprising a front axle, a rear axle, a bolster carried by the front axle, a reach comprising two members having longitudinally extended abutting straight middle portions secured to each other, the rear ends of said members diverging on a compound curve, said reach being also provided with forwardly extended portions diverging in straight lines and to less degree than the rear portions to permit torsional flexibility, brace rods for the rear axle, clips embracing the abutting portions of said reach members to unite them and also connecting the forward ends of said brace rods to the straight middle portion of said reach, a spring resting upon said bolster, and clips for securing said reach and spring to said bolster.

In testimony whereof I affix my signature in presence of two witnesses.

JOSEPH P. BROWNLEE.

Witnesses:
S. E. BURKE,
JOHN F. COTTER.